C. F. ECKART.
METHOD AND MEANS FOR ENHANCING THE GROWTH OF PLANTS.
APPLICATION FILED MAR. 1, 1921.
1,382,069.
Patented June 21, 1921.
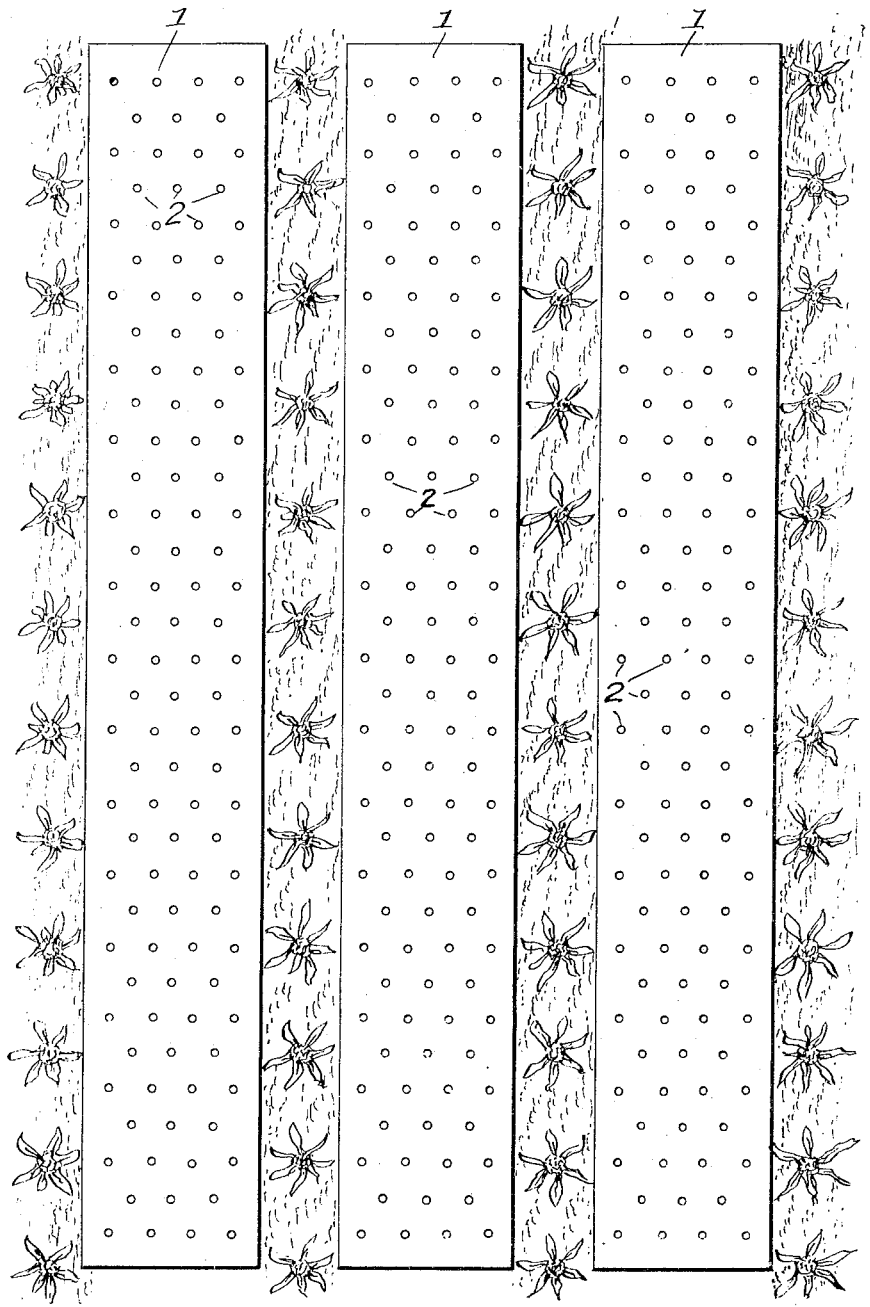

UNITED STATES PATENT OFFICE.

CHARLES F. ECKART, OF HONOLULU, TERRITORY OF HAWAII.

METHOD AND MEANS FOR ENHANCING THE GROWTH OF PLANTS.

1,382,069.   Specification of Letters Patent.   Patented June 21, 1921.

Application filed March 1, 1921. Serial No. 448,834.

*To all whom it may concern:*

Be it known that I, CHARLES F. ECKART, a citizen of the United States, residing in the city of Honolulu, Territory of Hawaii, have invented certain new and useful Improvements in Methods and Means for Enhancing the Growth of Plants; and I do hereby declare the following to be a full, clear, and exact description of the invention such as will enable others skilled in the art to which it appertains to make and use the same.

This invention relates to a novel form of mulshing device, and the method of applying and employing the same to enhance the growth of plants of various kinds, such as are usually developed in rows, and to this end the invention comprises the provision of a mulshing device in the form of a sheet, strip or elongated section of paper or similar material, which is either coated, impregnated or otherwise treated with asphalt, tar or similar material, which will render the mulsh when applied to the soil capable of absorbing relatively large quantities of solar heat, and transmitting the same into the soil, where it produces ideal conditions for the promotion of the rapid development of the plants.

The mulshing strip is also provided with a relatively large number of comparatively small perforations, distributed throughout the area of the strip, to permit water or moisture applied to the strip by natural or artificial means to pass through the mulsh and enter the soil in the form of a multitude of percolating streams, draining through the openings from the relatively large superficial area of the mulshing strip, so that the water thus collected or concentrated into these streams penetrates the soil to a greater depth than would a like quantity of water uniformly and evenly distributed over the surface of the soil.

This particular manner of distributing water to the soil, resulting in a relatively deep penetration thereof, produces efficacious moisture conditions even with very light showers of rain, and at times when, in the conventional practice, the ground would not be wetted to a sufficient depth to render the water available to the plant roots. A very light shower which would, in the case of an ordinary mulsh composed of litter or straw, for instance, simply wet the upper part of the same without reaching the soil, would, with the thin, sheet-form, perforated mulsh above described, which is essentially water proof between the perforations, cause water to collect on the surface and drain into the ground with sufficient volume to cause a material penetration of the soil mass at the points defined by the perforations of the mulsh.

In the particular application of the invention, the mulshing strips, comprising opaque, heat-absorbing material provided with the perforations aforesaid, are laid between the plant rows in flat surface contact with the ground, and serve not only to cause a rapid germination and extermination of weeds in the subjacent soil areas, but also produce and maintain exceptionally favorable conditions of heat and moisture in the soil areas between the plant rows, which induce the roots of the plants to a vigorous and healthy growth toward and into the soil areas covered by the mulshing strips, with a corresponding and concurrent development of the plants as a whole.

The mode of applying the invention is diagrammatically illustrated in the accompanying drawing, which illustrates a section of a planted field, including four rows of plants, with mulshing strips of the character described applied between the rows.

Referring to the drawings—

1 indicates a strip or sheet of paper or other material which is coated or impregnated with asphalt, tar, bitumen or similar material, which renders the mulshing strip capable of absorbing large amounts of solar heat and transmitting or distributing the same throughout the body of the subjacent soil, so that the average daily temperature of the soil is materially increased, and the variations between the day and night temperatures materially reduced. These mulshing strips are laid in regular order between the plant rows, in the relation shown, so that practically the entire soil area between the several plant rows is supplied with increased amounts of solar heat which, when once transmitted to the soil, is largely retained therein by the blanketing effect of the mulshing strips, which reduce the exposed surface of the soil and therefore diminish the dissipation of the stored heat.

The disposition of the mulshing strips between the plant rows also has the beneficial effect of practically suppressing the growth of weeds or objectionable plants or vegetation in the covered spaces, so that all of the elements of the soil in the covered spaces, which are necessary and beneficial to the promotion and stimulation of the growth of the desired plants, will be available to the latter.

In addition to the suppression of the weeds, and the supplying of large quantities of solar heat to the soil areas covered by the mulshing strips, it is also necessary and desirable to induce in the soil areas moisture conditions which are best calculated to secure, in conjunction with the heat, an optimum development and growth of the plant stock. To effect this result, each of the mulshing strips 1 is provided with a multiplicity of relatively small holes or foramina, distributed with substantial uniformity over the surface, and separated by comparatively large imperforate sections of the mulsh, which latter serve as water-sheds for rain, dew or water artificially applied to the surface of the strips, and from which the water is directed through the holes or foramina in the form of percolating streams which penetrate the soil to a much greater depth than would a like quantity of water applied uniformly and evenly to the surface of the soil. The result of this distribution of the water into the soil by the multitude of small streams causes the greater part of the water to be disseminated throughout the subjacent soil to a sufficient depth to be available to the plant roots, so that the duty of water under conditions of small precipitation is greatly increased.

A further effect of the mulshing strips is to substantially entrap the water in the soil, and prevent evaporation thereof, inasmuch as the moistened soil areas underlying the mulshing strips are protected by the latter from the natural elements which would tend to produce the evaporation of the water from the soil.

Practical application of the mulshing system as described have demonstrated that it will very largely accelerate the growth of the plants and increase the yield thereof, both as to the elements of the plant within the soil and those out of the soil, and will, moreover, reduce the cost of production to a very large extent, not only as a result of the increased yield but by decreasing the labor requirements in cultivating the soil areas between the plant rows.

It will be noted, therefore, that the application of this particular mode of mulshing insures practically ideal conditions as to warmth and moisture in the zones of soil between the plant rows, which induce a greatly increased activity of the plant roots, so that the development of the plants is not only materially accelerated, but the extent of the plant development is also largely increased, and these conditions are maintained, inasmuch as the blanketing effect of the mulshing strips serves to maintain the desired conditions of heat and moisture within the mulshed soil areas.

It will be noted that the holes or foramina in the mulshing strips may be formed either when the mulsh material is made up in the form of rolls of paper or like fabric, or after the strips have been actually applied and in surface contact with the soil. It will also be apparent that the beneficial results of this particular mode of mulshing may be secured by placing the mulshing strips in alternate spaces between the plant rows, or, as shown, in each space between the plant rows.

The mulshing strips may be laid either before or after the plants or plant producing stock are set out in the plant rows. In the former case the longitudinal edges of the mulsh afford a convenient and ready means or guide for the regular and even spacing of the plant rows. The strip of suitable width to insure proper spacing is unrolled or laid on the ground in surface contact with the same, and the plants or plant producing stock are then planted in the soil lying outside of and immediately contiguous to the longitudinal margins of the strip.

What I claim is:

1. A method of enhancing the growth of plants, which comprises applying to the surface of the soil, in spaces between the plant rows, foraminated strips of opaque, heat-absorbing material; whereby water is caused to penetrate the soil through the foramina, and solar heat is absorbed by the covering strips and delivered to the subjacent soil.

2. A method enhancing the growth of plants, which comprises applying to the surface of the soil, in spaces between the plant rows, foraminated strips of paper treated with asphaltum or the like; whereby water is caused to penetrate the soil through the foramina, and solar heat is absorbed by the covering strips and delivered to the subjacent soil.

3. A method of enhancing the growth of plants, which comprises superimposing on the ground a multi-perforated strip of asphalt-treated material, and planting the plants or plant producing stock in the contiguous soil areas in lines which are defined by and are outside of the longitudinal margins of said strip.

4. A mulshing device, comprising a sheet or strip-like body of material, impregnated or coated with a heat-absorbing medium, and having a series of relatively small perforations throughout the body thereof.

5. A mulshing device, comprising a strip of paper impregnated or coated with asphaltum or the like, and having a series of relatively small perforations distributed throughout the body thereof.

In testimony whereof I affix my signature.

CHARLES F. ECKART.